US012710014B2

(12) United States Patent
Charbonnel et al.

(10) Patent No.: US 12,710,014 B2
(45) Date of Patent: Aug. 18, 2026

(54) SYSTEM AND METHOD FOR ADAPTIVE CONTROL OF AIR-TO-FUEL RATIO

(71) Applicant: Caterpillar Inc., Peoria, IL (US)

(72) Inventors: Sylvain J. Charbonnel, Peoria, IL (US); Joseph Pisani, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/982,300

(22) Filed: Dec. 16, 2024

(65) Prior Publication Data

US 2026/0168452 A1 Jun. 18, 2026

(51) Int. Cl.

| | |
|---|---|
| ***F02D 41/02*** | (2006.01) |
| ***F01N 3/10*** | (2006.01) |
| ***F01N 11/00*** | (2006.01) |
| ***F02D 41/00*** | (2006.01) |
| ***F02D 41/14*** | (2006.01) |
| ***F02D 41/38*** | (2006.01) |
| ***F02D 41/40*** | (2006.01) |

(52) U.S. Cl.

CPC ......... *F02D 41/0295* (2013.01); *F01N 3/101* (2013.01); *F01N 11/007* (2013.01); *F02D 41/3827* (2013.01); *F02D 41/40* (2013.01); *F01N 2430/06* (2013.01); *F01N 2560/025* (2013.01); *F01N 2560/026* (2013.01); *F01N 2900/04* (2013.01); *F01N 2900/0416* (2013.01); *F01N 2900/1402* (2013.01); *F01N 2900/1614* (2013.01); *F01N 2900/1624* (2013.01); *F02D 41/0052* (2013.01); *F02D 41/1454* (2013.01); *F02D 41/146* (2013.01)

(58) Field of Classification Search

CPC combination set(s) only.
See application file for complete search history.

(56) References Cited

U.S. PATENT DOCUMENTS

| | | | | |
|---|---|---|---|---|
| 5,416,710 | A * | 5/1995 | Kuroda | F01N 11/002 701/99 |
| 6,019,093 | A | 2/2000 | Kitagawa | |
| 6,233,922 | B1 * | 5/2001 | Maloney | F02D 41/1401 60/276 |
| 6,523,340 | B1 * | 2/2003 | Kurihara | F01N 11/005 60/276 |
| 6,739,122 | B2 | 5/2004 | Kitajima et al. | |
| 7,412,820 | B2 | 8/2008 | Iida et al. | |
| 7,694,508 | B2 | 4/2010 | Iida et al. | |
| 10,100,763 | B2 | 10/2018 | Okubo et al. | |

(Continued)

*Primary Examiner* — Binh Q Tran

(57) ABSTRACT

An air-fuel ratio control system includes an internal combustion engine configured to combust gaseous fuel, an admission valve configured to provide gaseous fuel to the internal combustion engine, and a three-way catalyst connected to the internal combustion engine to receive exhaust formed by combustion of the gaseous fuel with the internal combustion engine. The system also includes a sensor connected upstream or downstream of the three-way catalyst and a controller configured to: generate commands for controlling the admission valve, receive oxygen content signals or NOx content signals output from the sensor, and determine, with a perturbation-based control algorithm and based on the oxygen content signals or NOx content signals, commands for controlling an air-fuel ratio of the internal combustion engine, including commands for controlling the admission valve.

20 Claims, 5 Drawing Sheets

(56) References Cited

U.S. PATENT DOCUMENTS

| | | | | |
|---|---|---|---|---|
| 2004/0261397 | A1* | 12/2004 | Yang | F01N 3/0814 60/299 |
| 2007/0227123 | A1* | 10/2007 | Iida | F01N 3/101 60/276 |
| 2008/0196390 | A1* | 8/2008 | Sakamoto | F01N 11/007 60/276 |
| 2011/0231084 | A1* | 9/2011 | Nagakura | F02D 41/1498 701/111 |
| 2016/0123266 | A1* | 5/2016 | Otsubo | F02D 41/14 123/445 |
| 2023/0212994 | A1 | 7/2023 | Magner et al. | |

* cited by examiner

SYSTEM AND METHOD FOR ADAPTIVE CONTROL OF AIR-TO-FUEL RATIO

TECHNICAL FIELD

The present disclosure relates generally to aftertreatment systems, and more particularly, to methods and systems for controlling air to fuel ratio of an internal combustion engine.

BACKGROUND

Internal combustion engines are useful in numerous applications and used to generate power for propulsion, to perform work, or to provide electrical energy. Internal combustion engines include sophisticated control systems to optimize fuel economy, improve transient response, and reduce undesired emissions. Some internal combustion engines, including internal combustion engines that are designed for combustion of gaseous fuel, are also provided with aftertreatment systems, such as catalysts, that reduce emissions of nitrogen oxides (NOx), hydrocarbons, and methane ($NH_3$).

Engines configured for combustion of gaseous fuel, such as natural gas, can be coupled with a type of catalyst being selected based on the combustion strategy employed by the engine. For example, engines configured to combust fuel with a stoichiometric air-to-fuel ratio, also referred to as stoichiometric engines, can be paired with a three-way catalyst. Stoichiometric engines with three-way catalysts are generally efficient and can produce fewer emissions than other engine systems. However, these advantages are achieved by maintaining an appropriate air-to-fuel ratio, which is particularly challenging when the type of fuel changes, causing a change in the amount of air necessary to achieve stoichiometric combustion, or when the catalyst's performance changes over time. In an effort to address these challenges, devices, such as portable emission measurement systems (PEMs), are used by field technicians to monitor the engine systems and perform manual adjustments. These adjustments, as well as the use of PEMs, increase operational cost and introduce additional complexity.

U.S. Pat. No. 6,739,122, issued on May 25, 2004 ("the '122 patent"), describes an air-fuel ratio feedback control apparatus that uses an air-fuel ratio detector in an exhaust system. A diagnostic system diagnoses a NOx purifier in this system by changing the air-fuel ratio from lean to rich and monitoring the resulting signal from an $O_2$ sensor downstream of the NOx purifier. The system of the '122 patent seeks to avoid overshoot of the actual air-fuel ratio by reducing feedback control gain when the air-fuel ratio is changed from lean to rich. The system in the '122 patent does not describe control of an air-fuel ratio by implementing a control strategy that is capable of adapting to different conditions.

The methods and systems of the present disclosure may solve one or more of the problems set forth above or other problems in the art. The scope of the protection provided by the present disclosure, however, is defined by the attached claims, and not by the ability to solve any specific problem.

SUMMARY

In a first aspect, an air-fuel ratio control system may include an internal combustion engine configured to combust gaseous fuel, an admission valve configured to provide gaseous fuel to the internal combustion engine, and a three-way catalyst connected to the internal combustion engine to receive exhaust formed by combustion of the gaseous fuel with the internal combustion engine. The system may also include a sensor connected upstream or downstream of the three-way catalyst and a controller configured to: generate commands for controlling the admission valve, receive oxygen content signals or NOx content signals output from the sensor, and determine, with a perturbation-based control algorithm and based on the oxygen content signals or NOx content signals, commands for controlling an air-fuel ratio of the internal combustion engine, including commands for controlling the admission valve.

In another aspect, a method for controlling an air-fuel ratio for an internal combustion engine may include receiving oxygen signals output from an oxygen sensor or NOx signals from a NOx sensor, determining a first air-fuel ratio command, and adjusting, as a first adjustment, the first air-fuel ratio command to increase or decrease a commanded air-fuel ratio. The method may further include controlling at least one of: an admission valve, an intake throttle valve, or an exhaust gas recirculation valve based on the first adjustment, determining a second air-fuel ratio command, adjusting, as a second adjustment, the second air-fuel ratio command increasing or decreasing the commanded air-fuel ratio, one of the first adjustment or the second adjustment increasing the commanded air-fuel ratio command, the other of the first adjustment or the second adjustment decreasing the commanded air-fuel ratio, the first adjustment and the second adjustment being generated to cause repeating variations in the air-fuel ratio, and controlling at least one of: the admission valve, the intake throttle valve, or the exhaust gas recirculation valve based on the second air-fuel ratio command.

In yet another aspect, a system for controlling an air-fuel ratio for an internal combustion engine may include an internal combustion engine configured to combust fuel, a valve for providing fuel to the internal combustion engine, a catalyst connected to the internal combustion engine to receive exhaust formed by combustion of the fuel with the internal combustion engine, and a sensor configured to detect oxygen or NOx present in the exhaust. The system may also include a controller configured to: generate commands for controlling the valve, receive signals output from the sensor, determine a desired air-fuel ratio, and adjust the desired air-fuel ratio by generating an adjusted air-fuel ratio command that is above or that is below the desired air-fuel ratio as part of an adaptive control strategy.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value.

Figure 1:
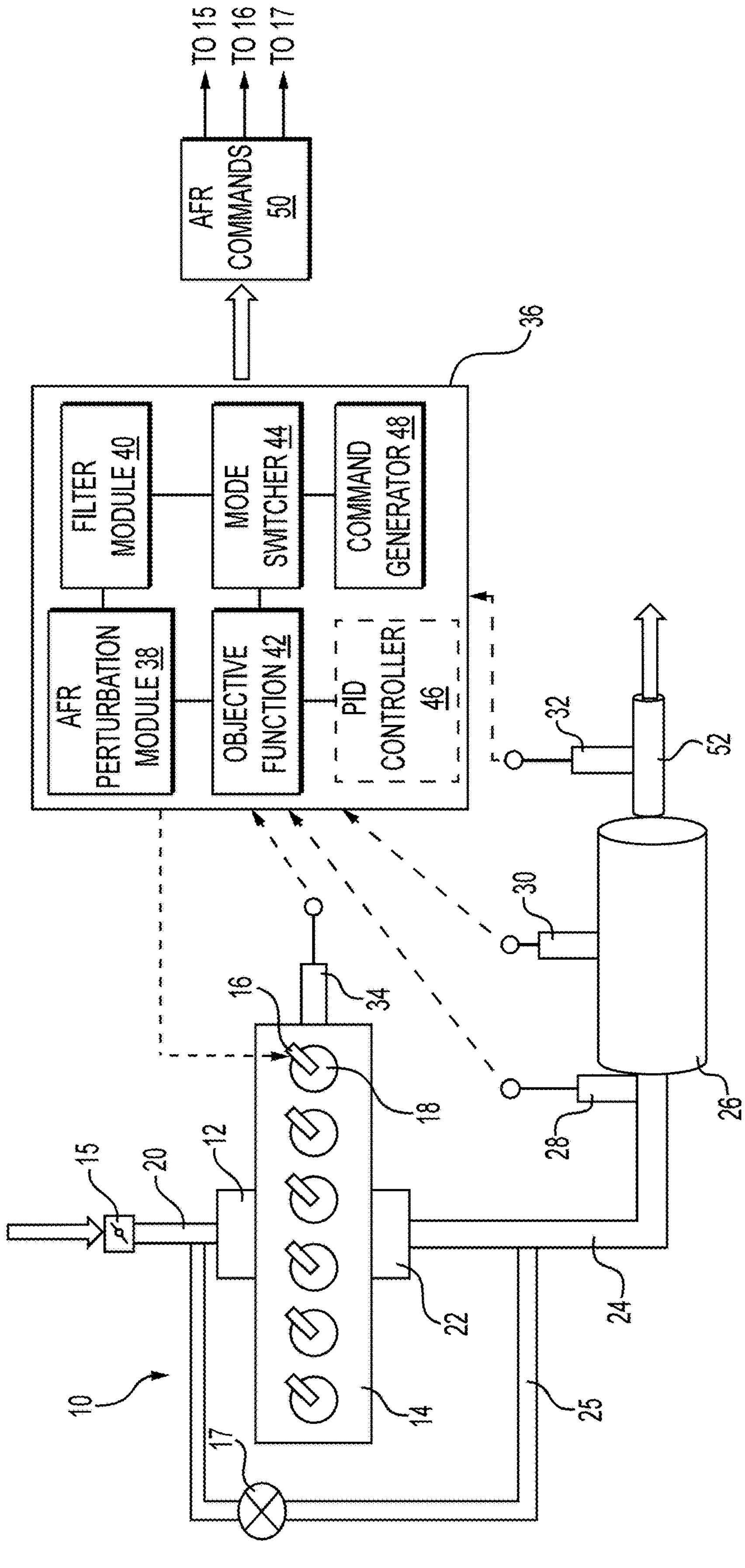
FIG. 1 is a schematic diagram of an adaptive control system for an internal combustion engine system, according to aspects of the disclosure.

FIG. 1 depicts a schematic diagram of an air-to-fuel ratio, or an "air-fuel ratio," control system 10 for adaptive control of components associated with an internal combustion engine 14. As shown in FIG. 1, air-fuel ratio control system 10 may include an intake air system, an exhaust system including one or more aftertreatment components, internal combustion engine 14, and an electronic control module (ECM) 36.

Internal combustion engine 14 may be configured to combust gaseous fuel, gaseous fuel being fuel supplied to a series of fuel valves, such as one or more admission valves 16, while in a gaseous state. Admission valves 16 may be any valve configured to introduce gaseous fuel. While admission valves 16 are shown in a configuration to directly supply fuel to a cylinder 18, as understood, valves 16 may be connected to intake manifold 12, intake passage 20, or at any suitable location downstream of an intake throttle valve (ITV) 15.

Engine 14 may be a stoichiometric engine, an engine intended to be operated at an air-fuel ratio that is equal to or approximately equal to the stoichiometric ratio of air to fuel (e.g., at lambda values approximately equal to 1.0 according to the type of fuel provided to engine 14). Gaseous fuel may include natural gas, hydrogen gas, propane, butane, methane, and others. Internal combustion engine 14 may include a plurality of cylinders 18, six cylinders 18 being shown.

An air intake system for supplying air to internal combustion engine 14 may include an intake manifold 12 and an intake passage 20 located upstream of intake manifold 12. ITV 15 may be connected upstream of intake manifold 12, a position of ITV 15 being configured to restrict an amount of air that flows to intake manifold 12.

An exhaust system for internal combustion engine 14 may include an exhaust manifold 22, an exhaust passage 24, and one or more aftertreatment devices. In the illustrated example, the aftertreatment device includes a three-way catalyst 26 suitable for use with a stoichiometric engine and an exhaust exit passage 52 connected downstream of three-way catalyst 26.

If desired, the exhaust system may be configured for exhaust gas recirculation (EGR). Components for providing EGR capability may include an EGR passage 25 and an electronically-controlled EGR valve 17. While only a single aftertreatment device is shown in FIG. 1, as understood, additional aftertreatment devices (e.g., particulate filters or additional catalysts) may be included in the exhaust system of system 10.

ECM 36 may be configured to control the operation of internal combustion engine 14 and associated systems. In particular, ECM 36 may generate commands for controlling ITV 15, admission valves 16, and EGR valve 17. If desired, ECM 36 may also generate signals for controlling the generation of a spark with a spark plug (not shown) connected to each cylinder 18 or for controlling diesel fuel injectors for injecting diesel fuel (e.g., as a pilot fuel that facilitates combustion of gaseous fuel within cylinders 18). ECM 36 may be connected to a sensor system of air-fuel ratio control system 10 for monitoring conditions of system 10. The sensor system may include an upstream sensor 28 (e.g., an oxygen sensor or a NOx sensor) connected upstream of three-way catalyst 26, a temperature sensor 30 configured to measure a temperature of three-way catalyst 26, a downstream sensor 32 (e.g., an oxygen sensor or a NOx sensor) connected downstream of three-way catalyst 26 such as at exhaust exit passage 52, an emissions sensor 35, and an engine speed sensor 34. Sensors 28 and 32 may be configured to detect oxygen content or NOx content upstream and downstream of three-way catalyst 26, respectively. Additional sensors of the sensor system may include additional temperature sensors, flow sensors, knock sensors, and others.

ECM 36 may encompass a single control module, or controller. As used herein, a "controller" encompasses both single controllers or control modules, or a plurality of controllers or control modules. ECM 36 may embody a single processor or multiple processors that receive inputs, such as oxygen levels or NOx levels from upstream sensor 28 and downstream sensor 32, and generate outputs, such as commands for ITV 15, admission valves 16, and electronically-controlled EGR valve 17. ECM 36 may include a memory, a secondary storage device, a processor such as a central processing unit, or any other means for accomplishing a task consistent with the present disclosure, as described below. The memory or secondary storage device associated with ECM 36 may store data and software to allow ECM 36 to perform its functions, including the functions described with respect to method 500, also described below. Numerous commercially available microprocessors can be configured to perform the functions of ECM 36. Various other known circuits may be associated with ECM 36, including current monitoring circuitry, signal-conditioning circuitry, communication circuitry, and other appropriate circuitry.

As shown in FIG. 1, ECM 36 may be configured with modules (e.g., programming, algorithms, etc.) that allow ECM 36 to perform air-fuel ratio control in an adaptive manner, such as extremum seeking control. Modules of ECM 36 may include an air-fuel ratio (AFR) perturbation module 38, a filter module 40, an objective function 42, a mode switcher 44, an optional proportional-integral-derivative module 46, and a command generator 48. Modules 38-46, in conjunction with command generator 48, may generate AFR commands 50 that adjust the air-fuel ratio of internal combustion engine 14 to seek an objective or to seek a minimum cost, as described below.

Perturbation module 38 may be configured to perturb, or adjust, commands for seeking a particular air-fuel ratio. Perturbation module 38 may, for example, receive a desired air-fuel ratio (e.g., a baseline or other desired air-fuel ratio value, such as a value generated without the use of an adaptive control strategy), or a command for a desired air-fuel ratio, and adjust this desired air-fuel ratio. These adjustments may be made in a repeating manner, resulting in relatively minor variations in the air-fuel ratio. These relatively small fluctuations may be, for example, fluctuations that result in a change of less than ±1% to the desired air-fuel ratio once an optimum air-fuel ratio command has been identified by maximizing an objective function, as described below. Variations in the air-fuel ratio include changes that increase or decrease a commanded air-fuel ratio command. These variations, in at least some embodiments, are not based on achieving a desired output, but instead are applied to shift the desired air-fuel ratio in a manner that increases or decreases the commanded air-fuel ratio. In some aspects, the term "perturbation" as used herein is a variation applied to a signal or command, each variation moving the signal command in either an increasing direction or in a decreasing direction. In particular, perturbation module 38 may cause repeated oscillations, each oscillation including at least one increased command and at least one decreased command. Perturbations generated with module 38 may allow ECM 36 to monitor how the adjusted commands impact the quantity of oxygen or NOx detected with upstream sensor 28 and downstream sensor 32.

Filter module 40 may include low pass filtering and high pass filtering functionality. High-pass filtering may be performed to remove bias from the output monitored by ECM 36 (e.g., filtering performed on oxygen content signals received from downstream sensor 32). Low-pass filtering may reduce or eliminate the effect of noise on the adaptive control strategy implemented with ECM 36.

Objective function 42 may determine the goals of the adaptive control performed with ECM 36. In particular, objective function 42 may include objectives or costs that represent desired or undesirable outcomes, respectively. In the example of a cost function, lower costs may be associated with more desirable outcomes, such as oxygen data or NOx data from sensor 32 indicating that combustion is approaching stoichiometric conditions. While the phrase "objective function," is used herein and is sometimes described as a function that represents goals or objectives, as understood, the phrase "cost function" is also considered to be an objective function as a cost function also seeks beneficial or desired conditions, for example by avoiding undesired outcomes.

In some aspects, objective function 42 may change over time or may be modified by a user. Objective function 42 may reflect a current operating mode of air-fuel ratio control system 10. Example operating modes may include a mode that prioritizes reduction of emissions, a mode that prioritizes increased fuel economy, a mode that temporarily boosts power output by internal combustion engine 14, and others.

Mode switcher 44 may be configured to enable or disable adaptive control strategies, such as extremum seeking control, employed by ECM 36. When adaptive control is enabled, modules 38, 40, and 42 may be active and operable as described above. Mode switcher 44 may disable adaptive control if desired (e.g., to discontinue issuing perturbations for a period of time).

Mode switcher 44 may be further configured to enable and disable the adaptive control strategy employed with perturbation module 38, filter module 40, and cost function 42 based on current conditions of system 10 (e.g., engine speed detected with engine speed sensor 34, temperature of engine 14, temperature of three-way catalyst 26 detected with temperature sensor 30, and others). In some examples, mode switcher 44 may be configured to enable adaptive control for a period of time sufficient to identify the air-fuel ratio commands that maximize the objects represented with objective function 42.

Commands from ECM 36 may be generated with command generator 48. These commands 50 cause a desired (e.g., target) air-fuel ratio to be present within plurality of cylinders 18 of internal combustion engine 14. This air-fuel ratio may be targeted by generating outputs to at least one of ITV 15, admission valves 16, or EGR valve 17. For example, air-fuel ratio may be increased by: opening ITV 15 by a greater degree, reducing an amount of time an admission valve 16 is open, or causing electronically-controlled EGR valve 17 to close or move to a more restrictive position. Air-fuel ratio may be decreased by: reducing the degree to which ITV 15 is open, increasing an amount of time an admission valve 16 is open, or causing electronically-controlled EGR valve 17 to move to a less restrictive position.

Figure 2:
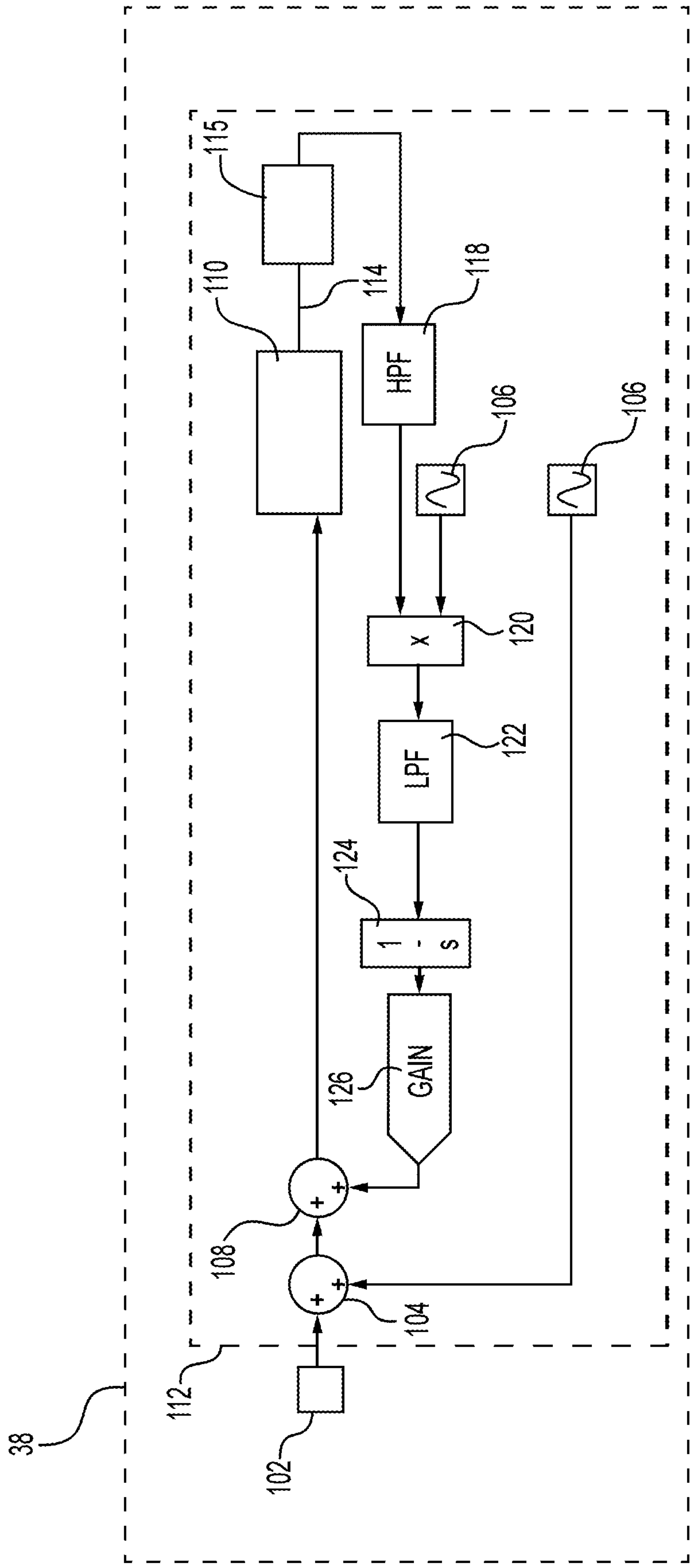
FIG. 2 is a block diagram of a controller for implementing adaptive control for the engine system of FIG. 1.

FIG. 2 is a block diagram illustrating an exemplary control strategy employed with ECM 36. Blocks or functions in FIG. 2 may correspond to one or more of perturbation module 38, filter module 40, objective function 42, and command generator 48. In particular, perturbation module 38 may be implemented via perturbation function 106 and command adjuster 104, filter module 40 may be implemented with high-pass filter 118 and LPF 122, objective function 42 may be implemented with objective function 115, multiplier 120, integrator 124, gain 126, and objective-seeking adjuster 108, and command generator 48 may correspond to generator 102 and adjuster 108. The operations illustrated in FIG. 2 may be performed when mode switcher 44 has enabled adaptive control.

In FIG. 2, an initial command and series of subsequent commands, such as commands for a desired air-fuel ratio, are generated with command generator 102. Commands from generator 102 are output to a command adjuster 104 at which a perturbation function 106 is combined (e.g., via addition) with the command from generator 102, acting to increase the value initially set with generator 102 when the output of perturbation function 106 is positive, or to decrease the value set with generator 102 when the output of perturbation function 106 to command adjuster 104 is negative. This adjusted command is output from command adjuster 104 to an objective-seeking adjuster 108 that generates adjustments that seek to maximize objective function 42. In some aspects, perturbation function 106 is a sinusoidal function which causes consistent repeating fluctuations that change in magnitude and in sign in a consistent manner. However, in other examples, perturbation function 106 may employ other functions (e.g., saw tooth functions, stepped functions, linear functions, etc.) which cause some fluctuations in an increasing (positive) direction and some fluctuations in a decreasing (negative) direction.

An adaptive control loop 112 may cause the generation of an adjusted set point. The set point may be used by PID controller 46 for the generation of adjusted commands to control one or more devices of air-fuel ratio control system 10 (e.g., commands to ITV 15, admission valves 16, or EGR valve 17). Adaptive control loop 112 may also facilitate monitoring of an output 114 caused by implementing the adjusted commands via plant 110. In adaptive control loop 112, plant 110 is shown to represent the components of air-fuel ratio control system 10, such as engine 14 and three-way catalyst 26. As understood, plant 110 is not included in, or modeled by, ECM 36. An output 114, received with objective function 115 via plant 110, may correspond to oxygen or NOx content from sensors 28, 32. Objective function 115 may be configured to generate and output costs associated with this oxygen or NOx content within output 114.

Adaptive control may be implemented with adaptive control loop 112. In particular, adaptive control may be achieved by components in loop 112, including objective function 115, perturbation function 106, a high-pass filter 118, a multiplier 120, a low-pass filter 122, an integrator 124, a gain 126, command adjuster 104, and objective-seeking adjuster 108. At times when adaptive control is not enabled, commands, such as desired air-fuel ratios, determined with generator 102 may be used to set the air-fuel ratio without adjustment by the elements of adaptive control loop 112.

Multiplier 120 may multiply the output from objective function 115 by the value of perturbation function 106, this function 106 being provided to facilitate the objective-seeking functionality of adaptive control loop 112. The value output from multiplier 120 may be received by LPF 122. LPF 122 may remove or reduce noise from this output. In particular, LPF 122 may remove or reduce measurement noise (e.g., noise introduced by sensors). Thus, LPF 122 may improve the stability of the adaptive control strategy employed by perturbation module 38, and may improve the speed at which outputs generated with perturbation module 38 arrive at optimal or near-optimal commands that satisfy the objective reflected by mode switcher 44.

Integrator 124 may integrate the signal output from multiplier 120 via LPF 122. This integration may allow control loop 112 to generate a command with a larger value when the previously-implemented command corresponds to a rising portion of an objective function (e.g., a location or portion of an objective function that, when plotted, has a positive slope). Integrator 124 may also be configured to cause control loop 112 to generate a command with a decreased value when the previously-implemented command corresponds to a falling portion of an objective function. Thus, when a previously-implemented command corresponds to a rising portion of an objective function, the value output from integrator 124 may be positive. When the previously-implemented command corresponds to a falling portion of an objective function, the value output from integrator 124 may be negative. Thus, the output of integrator 124 causes the algorithm to seek an optimum value (e.g., the objective of the objective function). The sign of the output from integrator 124 is not impacted by the gain 126 in embodiments where gain 126 is included in adaptive control loop 112.

Gain 126 is settable to increase or decrease how quickly the system moves to the optimum value, with larger values tending to facilitate more rapid identification of an optimal command. However, values for gain 126 that are too large may have an unfavorable impact on stability of the adaptive control strategy. It may therefore be advantageous to set the value of gain 126 accordingly.

Figure 3:
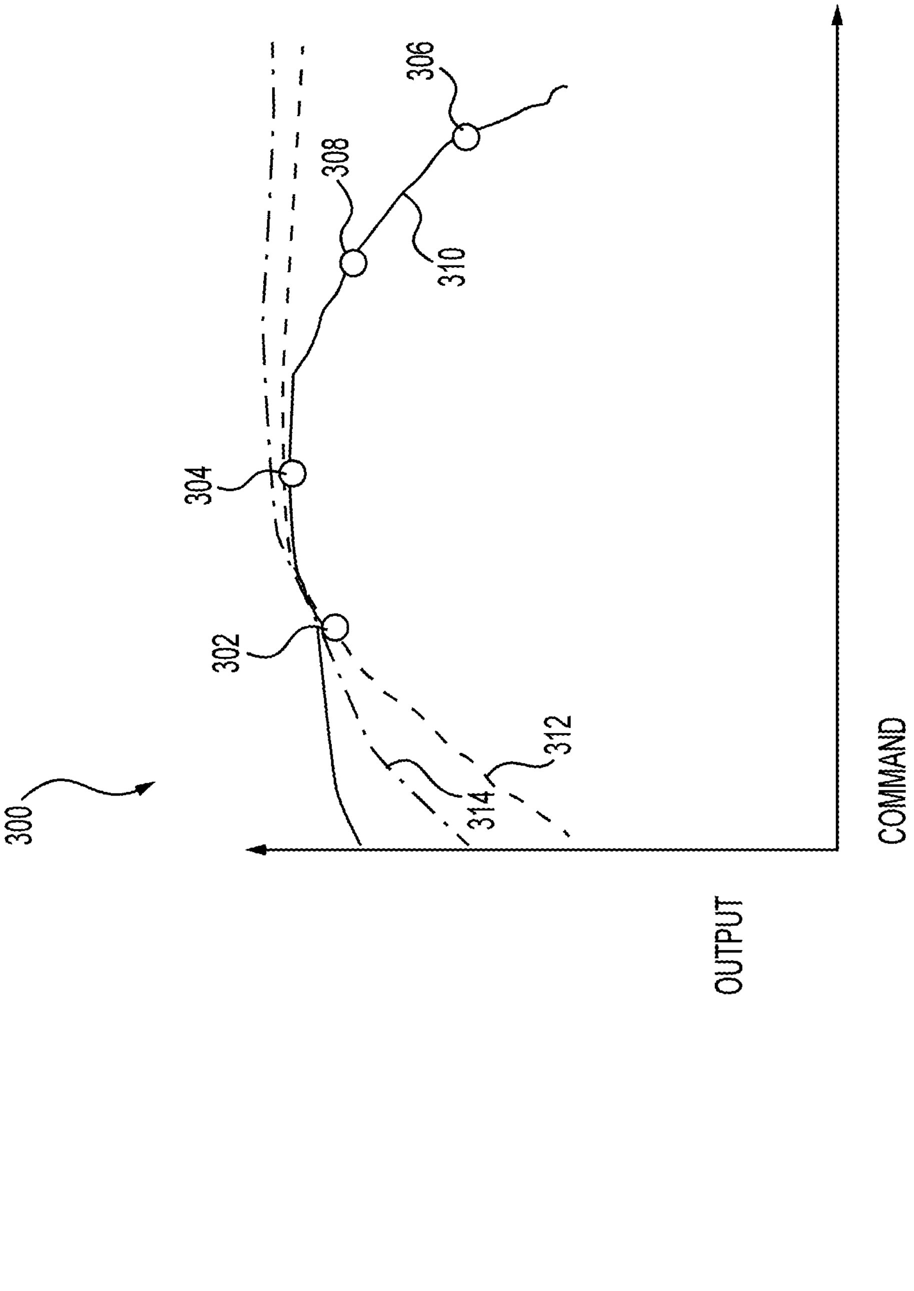
FIG. 3 is a chart illustrating commands selected via adaptive control for the engine system of FIG. 1 and outputs associated with the selected commands.

FIG. 3 illustrates a chart 300 that represents a plurality of potential commands (X-axis) that result in outputs (Y-axis). The commands represented by the X-axis in FIG. 3, the position of commands 302, 304, 306, and 308 with respect to the X-axis, may be air-fuel commands. The outputs represented by position on the Y-axis may correspond to an objective (e.g., objectives 310, 312, and 314) represented with objective function 42 (FIG. 1), this objective resulting from the associated command. In chart 300 of FIG. 3, three objectives are illustrated and used to determine whether a particular command maximizes an objective or multiple objectives. Multiple objectives may be used, for example, when a command or group of commands is capable of maximizing each objective simultaneously or substantially simultaneously, as represented by the overlap of objectives 310, 312, and 314 at command 304. In other examples, a different number of outputs may be maximized, such as one, two, four or a greater number of objectives. When multiple objectives are maximized, different objectives may be combined into a single objective function, with objectives having different weights or the same weight. While each command 302, 304, 306, and 308, is placed on the objective function with the lowest value, as understood, each command results in a corresponding output for each objective, three outputs in the illustrated example.

With continued reference to FIG. 3, the three exemplary objectives include a NOx objective 310, a CO objective 312, and an $NH_3$ objective 314. As the adaptive control strategies may be configured to identify the maximum of an objective function and the minimum of a cost function, the adaptive control strategy may seek the region or point where each objective is maximized, due to convergence of the objective functions, for example, as indicated above. Thus, ECM 36 may issue a command 302 that is located on an ascending portion of objective functions 310, 312, 314. Based on determining that command 302 results in outputs on ascending portions of each objective function, ECM 36 may generate the next command with an increase in air-fuel ratio to seek the maximum point of functions 310, 312, 314, as described above with respect to adaptive control loop 112 (FIG. 2).

ECM 36 may issue a command 306 that also fails to maximize the objective functions 310, 312, 314, the y-axis position of command 306 being placed on NOx objective 310 for illustration purposes, as noted above. As command 306 is located on a descending portion of the corresponding objective function, ECM 36 may determine, via adaptive control loop 112, that command 306 should be adjusted such that the air-fuel ratio is decreased. Thus, ECM 36 may generate a subsequent command, such as command 308, with a lower air-fuel ratio, as represented by the positions of commands 306 and 308 on the X-axis. The process may continue as the adaptive control strategy implemented via perturbation module 38, filter module 40, objective function 42, and command generator 48 of ECM 36 identifies a command 304 that is at or near the maximum value of the objective function or the minimum value of the cost function.

Advantageously, the adaptive control strategy may enable ECM 36 to make relatively large changes to the commanded air-fuel ratio when the output is located farther away from the peak of the objective function and smaller changes to the commanded air-fuel ratio when the output is at or near the peak of the objective function. For example, ECM 36 may be configured to make a greater change following the air-fuel ratio command 306 as compared to command 308. Further, once ECM 36 arrives at command 304, subsequent changes introduced via perturbation function 106 may be relatively small due to the configuration of adaptive control loop 112. These small changes may further allow ECM 36 to follow an objective function that changes over time. Thus, the adaptive control strategy may seek an optimum value and track the optimum value even as the physical system changes (e.g., as the behavior of three-way catalyst 26 changes over its useful life, causing shifts in NOx objective 310, CO objective 312, and $NH_3$ objective 314).

Figure 4:
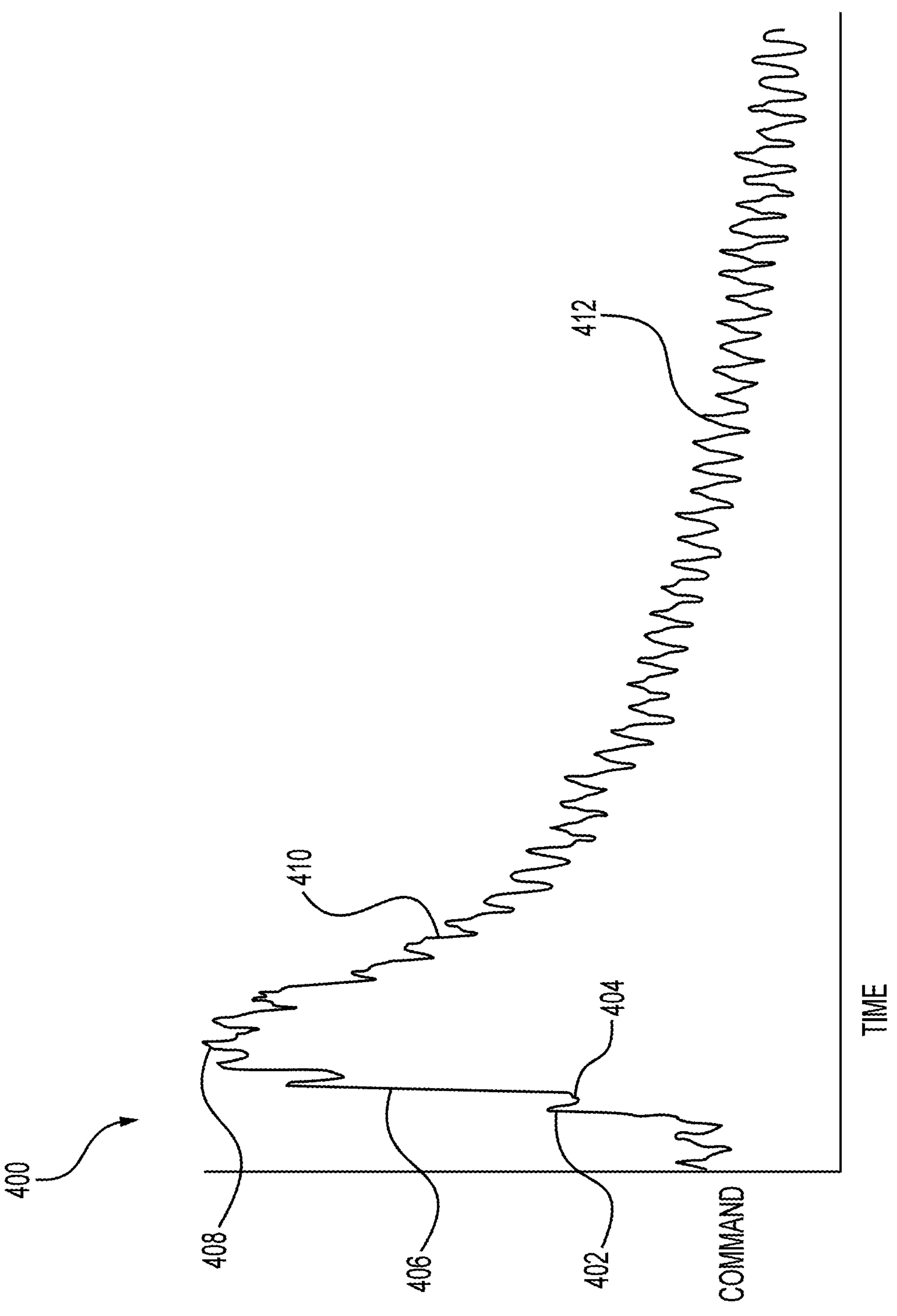
FIG. 4 is a chart illustrating commands selected over a period of time via adaptive control for the engine system of FIG. 1.

FIG. 4 is a chart representing example commands issued with command generator 48 of ECM 36 (FIG. 1) over time while an adaptive control strategy is employed. As can be seen in FIG. 4 commands 400 follow a general trend while exhibiting periodic peaks 402 and valleys 404 that are caused by perturbation applied with perturbation module 38, for example. FIG. 4 also illustrates a rapid increase 406 in commands (e.g., increasing air-fuel ratio) until reaching a peak 408. This peak 408 may represent the time at which ECM 36 arrived at an optimal command in view of objective function 42 (e.g., a command corresponding to point 304 of FIG. 3). Following peak 408, commands may generally follow a downward slope 410 that gradually decreases, including at portion 412. These changes illustrate the ability of ECM 36 to generate commands that respond to physical, chemical, or other changes to three-way catalyst 26. The changes to commands along slope 410 and portion 412 are exaggerated for purposes of illustration. As understood, changes to the performance of three-way catalyst 26 may take place over a relatively long period of time (e.g., multiple days, weeks, months, or years). In contrast, pairs of peaks 402 and valleys 404 may be separated from each other in a shorter period of time (e.g., milliseconds, seconds, minutes, or hours).

INDUSTRIAL APPLICABILITY

The disclosed aspects of the present disclosure may be applied to a variety of engines, and machines or vehicles having engines that generate power for propulsion, to move an implement, generate electrical energy, or perform other tasks. For example, the air-fuel ratio control system of the present disclosure may enable adaptive control that generates commands that change over time in response to changing performance of one or more components of the system, such as a three-way catalyst for machines that include internal combustion engines.

Figure 5:
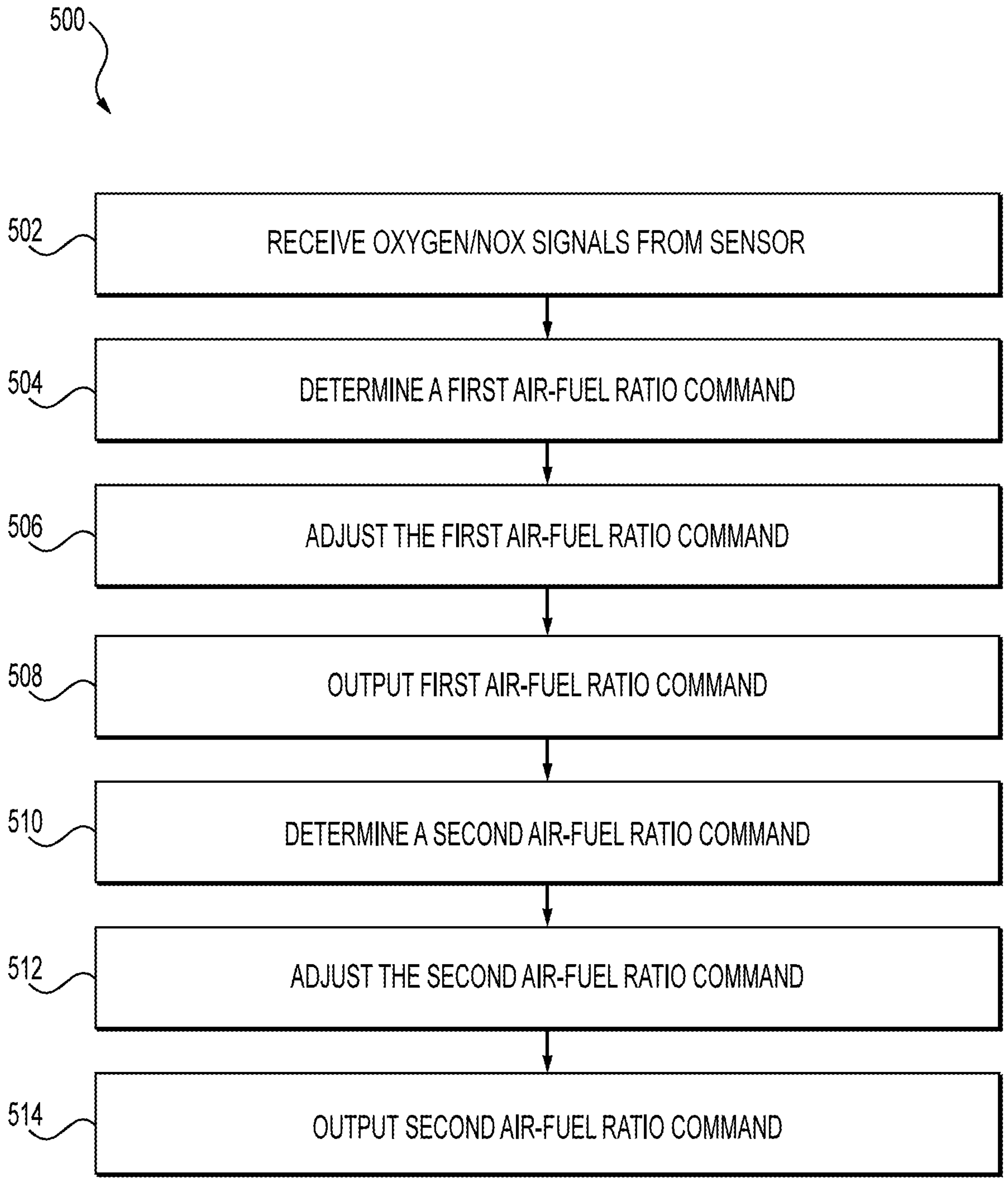
FIG. 5 is a flowchart of a method for controlling an air-fuel ratio for an internal combustion engine.

FIG. 5 is a flowchart showing a method 500 for controlling an air-fuel ratio for an internal combustion engine, according to aspects of the disclosure. A step 502 may include receiving oxygen signals from an oxygen sensor or NOx signals from a NOx sensor. In particular, step 502 may include receiving signals from at least one of upstream sensor 28 or downstream sensor 32 with ECM 36. In some aspects, step 502 includes receiving signals from both sensors 28 and 32 with ECM 36. Data from these signals may allow ECM 36 to determine the presence of residual oxygen or NOx in exhaust that exits engine 14, upstream of three-way catalyst 26 as well as downstream of three-way catalyst 26. Step 502 may be performed continuously while method 500 is performed such that updated oxygen or NOx signals are received by ECM 36 prior to the generation of each adjusted air-fuel ratio command.

A step 504 may include determining a first air-fuel ratio command. In some aspects, this command, determined with command generator 48, represents the air-fuel ratio that is expected to optimize objective function 42. This command is not, however, output by command generator 48 when mode switcher 44 causes ECM 36 to employ adaptive control. In circumstances where mode switcher 44 applies a control strategy other than adaptive control (e.g., PI or PID control), this command may be output via optional PID module 46 and command generator 48.

A step 506 may be performed when adaptive control is performed with ECM 36. In particular, step 506 may include adjusting the first air-fuel ratio command from step 504 with perturbation module 38. For example, as shown in FIG. 2, objective-seeking adjuster 108 may adjust an air-fuel ratio command based on outputs from perturbation function 106, high-pass filter 118, multiplier 120, LPF 122, integrator 124, and gain 126. The adjustment may be performed as described above with respect to FIG. 2, for example.

Once adjusted, the adjusted command may be output in a step 508. In some aspects, the command corresponds to an air-fuel ratio and the air-fuel command 50 (FIG. 1) corresponds to a plurality of individual commands for components of system 10. In the example illustrated in FIG. 1, commands 50 include individual commands for ITV 15, admission valves 16, and electronically-controlled EGR valve 17. In other configurations, commands 50 are generated for only one component of air-fuel ratio control system 10 (e.g., admission valves 16), or two components of air-fuel ratio control system 10 (e.g., admission valves 16 and either ITV 15 or electronically-controlled EGR valve 17).

Steps 510-514 may be performed in a manner similar to the description of steps 504-508, as described above. Further, updated oxygen signals or NOx signals may be received prior step 510. In step 510, a second air-fuel ratio command may be determined based on updated signals from sensors 28 or 32 and, if desired, based also on the first adjusted air-fuel ratio command. In particular, in step 510, command generator 48 may determine the second air-fuel ratio command based on determining whether the first air-fuel ratio command resulted in an output that is on an ascending portion of an objective function (e.g., point 302; FIG. 3) or a descending portion of an objective function (e.g., point 306 or 308; FIG. 3). As described above, the sign of the signal output with integrator 124 may result in a second command that increases or decreases the air-fuel ratio based on the output generated according to the first command or a command issued immediately prior generation of the second command (e.g., when one or more additional commands are issued between the first command and the second command).

In step 512, the second command may be adjusted. This adjustment may be made with command generator 48, as described above. In particular, step 512 may include combining perturbation function 106 with commands from generator 102 at command adjuster 104 or making an objective-seeking adjustment at objective-seeking adjuster 108. Following the adjustment, the adjusted command may be output in a step 514 with command generator 48.

In some aspects, adaptive control may allow for automatic adjustments to air-fuel ratio. Adjustments may be performed without the need for manual intervention, and may reduce or eliminate the need to take measurements with separate emission measurement systems. Additionally, adjustments may be made when changes occur to the system, such as physical or chemical changes to a catalyst. The adjustments made with the adaptive control strategy may reduce or eliminate impacts of these changes. Adaptive control may be performed without the use of a model representing the system, and unlike a static map or lookup table, may automatically change over time. Adaptive control may further facilitate adjustments in response to changing fuel conditions, without the need to calculate new stoichiometric values that correspond to the changed fuel. The adaptive control system may also allow the system to adapt to changes in the system other than to the received fuel or the activity of the catalyst, as the adaptive control strategy may continue to seek an objective that shifts due to other conditions.

It will be apparent to those skilled in the art that various modifications and variations can be made to the disclosed method and system without departing from the scope of the disclosure. Other embodiments of the method and system will be apparent to those skilled in the art from consideration of the specification and practice of the systems disclosed herein. It is intended that the specification and examples be considered as exemplary only, with a true scope of the disclosure being indicated by the following claims and their equivalents.

What is claimed is:

1. An air-fuel ratio control system, comprising:
an internal combustion engine configured to combust gaseous fuel;
an admission valve configured to provide gaseous fuel to the internal combustion engine;
a three-way catalyst connected to the internal combustion engine to receive exhaust formed by combustion of the gaseous fuel with the internal combustion engine;
a sensor connected upstream or downstream of the three-way catalyst; and
a controller configured to:
generate commands for controlling the admission valve,
receive oxygen content signals or NOx content signals output from the sensor, and
determine, with a perturbation-based control algorithm that employs extremum-seeking control and based on the oxygen content signals or NOx content signals, commands for controlling an air-fuel ratio of the internal combustion engine, including commands for controlling the admission valve for adjusting a position of the admission valve according to the extremum-seeking control performed with the controller.

2. The air-fuel ratio control system of claim 1, wherein the extremum-seeking control performed with the controller is configured to enable the controller to identify a target air-fuel ratio or a target equivalence ratio.

3. The air-fuel ratio control system of claim 1, wherein the perturbation-based control algorithm generates targets for maximizing an objective function or for minimizing a cost function.

4. The air-fuel ratio control system of claim 1, wherein the perturbation-based control algorithm is configured to adjust the air-fuel ratio of the internal combustion engine in response to a change in a fuel supplied to the internal combustion engine.

5. The air-fuel ratio control system of claim 4, wherein the perturbation-based control algorithm generates outputs that cause a reduction in a quantity of NOx that exits the three-way catalyst, the reduction occurring subsequent to the change in a type of fuel supplied to the internal combustion engine.

6. The air-fuel ratio control system of claim 1, wherein the perturbation-based control algorithm generates a first adjustment that causes an increase in the air-fuel ratio and a second adjustment that causes a decrease in the air-fuel ratio, the first adjustment and the second adjustment being repeated to perturb the air-fuel ratio.

7. The air-fuel ratio control system of claim 1, wherein the perturbation-based control algorithm is configured to adjust a quantity of oxygen stored with the three-way catalyst.

8. The air-fuel ratio control system of claim 1, wherein the perturbation-based control algorithm is applied at multiple intervals of time.

9. A method for controlling an air-fuel ratio for an internal combustion engine, the method comprising:
receiving oxygen signals output from an oxygen sensor or NOx signals from a NOx sensor;
determining a first air-fuel ratio command;
adjusting, as a first adjustment, the first air-fuel ratio command to increase or decrease a commanded air-fuel ratio;
controlling at least one of: an admission valve, an intake throttle valve, or an exhaust gas recirculation valve based on the first adjustment;
determining a second air-fuel ratio command;
adjusting, as a second adjustment, the second air-fuel ratio command increasing or decreasing the commanded air-fuel ratio, one of the first adjustment or the second adjustment increasing the commanded air-fuel ratio command, the other of the first adjustment or the second adjustment decreasing the commanded air-fuel ratio, the first adjustment and the second adjustment being generated to cause repeating variations in the air-fuel ratio via an algorithm that seeks an objective by making adjustments to commanded air-fuel ratios; and
controlling at least one of: the admission valve, the intake throttle valve, or the exhaust gas recirculation valve based on the second air-fuel ratio command according to adjustments to the commanded air-fuel ratios that are associated with the objective.

10. The method of claim 9, wherein the repeating variations are generated as part of an extremum-seeking control algorithm.

11. The method of claim 9, wherein, when the first air-fuel ratio command and the second air-fuel ratio command reflect the same air-fuel ratio, the repeating variations prevent controlling the at least one of: the admission valve, the intake throttle valve, or the exhaust gas recirculation to seek the same air-fuel ratio for consecutive commands.

12. The method of claim 9, wherein the first air-fuel ratio command corresponds to a desired air-fuel ratio, the first adjustment causing the first air-fuel ratio command to deviate from the desired air-fuel ratio.

13. The method of claim 9, wherein the first air-fuel ratio command corresponds to a desired air-fuel ratio, the first adjustment causing the first air-fuel ratio command to deviate from the desired air-fuel ratio by an amount, a magnitude of the amount being based on an objective function or on a cost function.

14. The method of claim 9, wherein the air-fuel ratio of the internal combustion engine is adjusted in response to a change in a fuel supplied to the internal combustion engine.

15. The method of claim 9, wherein the repeating variations are caused as part of an adaptive control strategy configured to change the air-fuel ratio in response to the internal combustion engine receiving a different fuel type.

16. A system for controlling an air-fuel ratio for an internal combustion engine, the system comprising:
an internal combustion engine configured to combust fuel;
a valve for providing fuel to the internal combustion engine;
a catalyst connected to the internal combustion engine to receive exhaust formed by combustion of the fuel with the internal combustion engine;
a sensor configured to detect oxygen or NOx present in the exhaust; and
a controller configured to:
generate commands for controlling the valve,
receive signals output from the sensor,
determine a desired air-fuel ratio, and
adjust the desired air-fuel ratio by generating an adjusted air-fuel ratio command that is above or that is below the desired air-fuel ratio as part of an adaptive control strategy that generates fluctuations that change a magnitude and a sign of the adjusted air-fuel ratio command.

17. The system of claim 16, wherein the adaptive control strategy employs extremum seeking control.

18. The system of claim 16, wherein the valve is an admission valve for providing gaseous fuel to the internal combustion engine.

19. The system of claim 16, wherein the controller is further configured to transition from a mode in which the adaptive control strategy is enabled to a mode in which the adaptive control strategy is disabled.

20. The system of claim 16, wherein the adaptive control strategy is configured to reduce a magnitude by which the adjusted air-fuel ratio command is above or below the desired air-fuel ratio based on an objective function or a cost function.

* * * * *